United States Patent
Morimoto

(10) Patent No.: US 11,755,256 B2
(45) Date of Patent: Sep. 12, 2023

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Hiroaki Morimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/699,437

(22) Filed: Mar. 21, 2022

(65) Prior Publication Data

US 2022/0308802 A1    Sep. 29, 2022

(30) Foreign Application Priority Data

Mar. 23, 2021   (JP) .................. 2021-048836

(51) Int. Cl.
    *G06F 3/12*    (2006.01)
(52) U.S. Cl.
    CPC ............ *G06F 3/1204* (2013.01); *G06F 3/126* (2013.01); *G06F 3/1231* (2013.01); *G06F 3/1236* (2013.01); *G06F 3/1284* (2013.01)
(58) Field of Classification Search
    CPC .... G06F 3/1204; G06F 3/1231; G06F 3/1236; G06F 3/126; G06F 3/1284
    USPC ........................................... 358/1.13
    See application file for complete search history.

(56) References Cited

U.S. PATENT DOCUMENTS

| | | | |
|---|---|---|---|
| 10,241,731 B2* | 3/2019 | Oya .................. | G06F 3/1284 |
| 2007/0146778 A1* | 6/2007 | Kitagata ............. | G06F 3/1204 |
| | | | 358/1.15 |

FOREIGN PATENT DOCUMENTS

WO    2011/115987 A2    9/2011

* cited by examiner

*Primary Examiner* — Darryl V Dottin
(74) *Attorney, Agent, or Firm* — VENABLE LLP

(57) ABSTRACT

A method of controlling an information processing apparatus includes registering a printer in the information processing apparatus, generating a print queue for the printer in a case where the printer is registered, and managing a plurality of addresses that are transmission destinations of print data in association with the generated print queue. In a case where the plurality of addresses are associated with a print queue corresponding to an option selected by a user in a screen for selecting a printer to be caused to perform printing based on print data, any address of the plurality of addresses is determined as a transmission destination address based on a predetermined condition, and control is performed to transmit the print data to the determined transmission destination address.

24 Claims, 14 Drawing Sheets

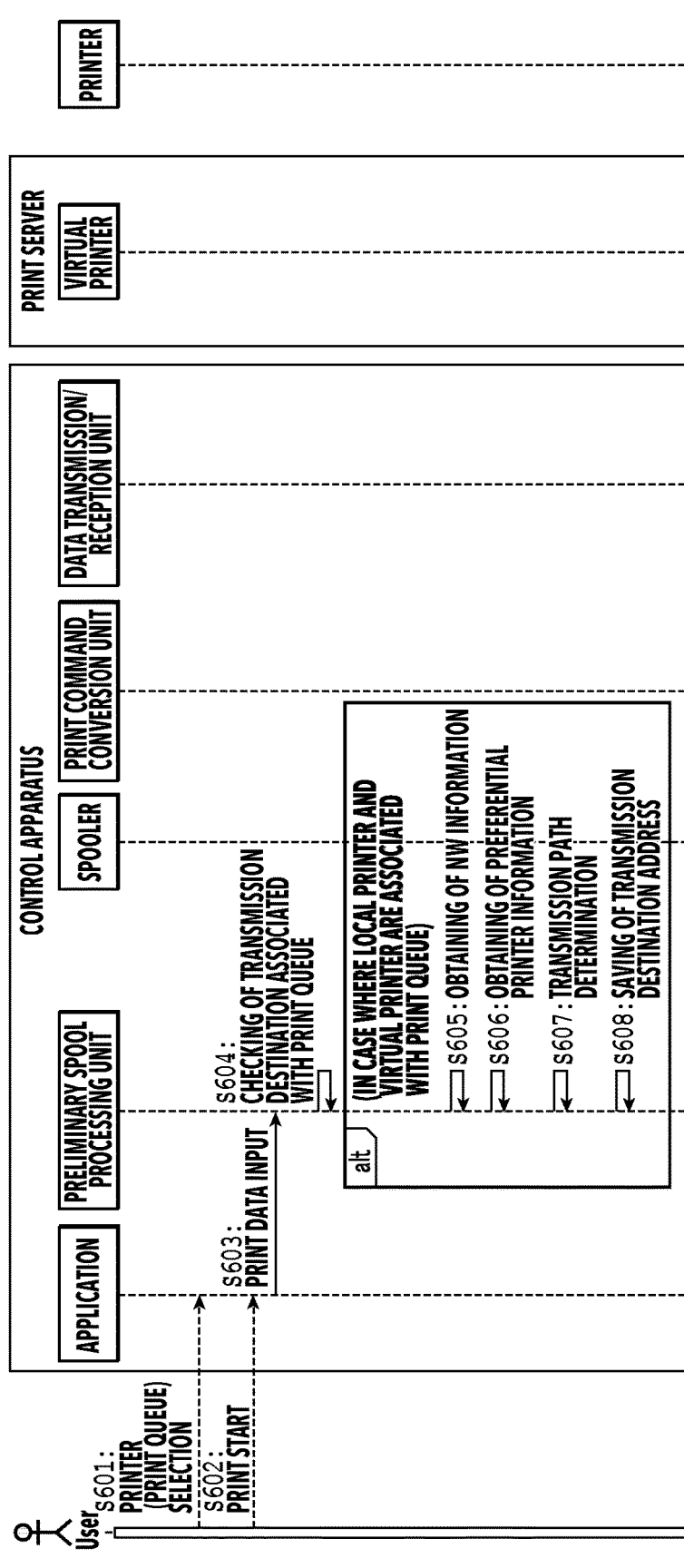

INFORMATION PROCESSING APPARATUS, METHOD OF CONTROLLING INFORMATION PROCESSING APPARATUS, AND STORAGE MEDIUM

BACKGROUND

Field

The present disclosure relates to a technique of causing a printer to execute printing.

Description of the Related Art

In a general print system, a control apparatus gives a print instruction to a printer connected via a local area network (LAN) or Universal Serial Bus (USB). Such a print system is referred to as local print system hereinafter. Meanwhile, International Patent Application Publication No. WO2011/115987 (hereinafter, referred to as Literature 1) describes a cloud print system in which a print server on the Internet transmits data to be printed to a printer via the Internet and causes the printer to perform printing.

There is a case where the same printer is registered in both of the local print system and the cloud print system in the control apparatus. In this case, there is a possibility that the user cannot appropriately select a printer suitable for printing.

SUMMARY

A method of controlling an information processing apparatus according to one embodiment of the present disclosure includes: registering a printer in the information processing apparatus; generating a print queue for the printer in a case where the printer is registered; and managing a plurality of addresses that are transmission destinations of print data in association with the generated print queue.

Further features of the present disclosure will become apparent from the following description of exemplary embodiments with reference to the attached drawings.

BRIEF DESCRIPTION OF THE DRAWINGS

FIG. 6 is a diagram showing the relationship of FIGS. 6A and 6B;

FIGS. 6A and 6B are together a sequence diagram illustrating an example of a print process;

DESCRIPTION OF THE EMBODIMENTS

Figure 1:
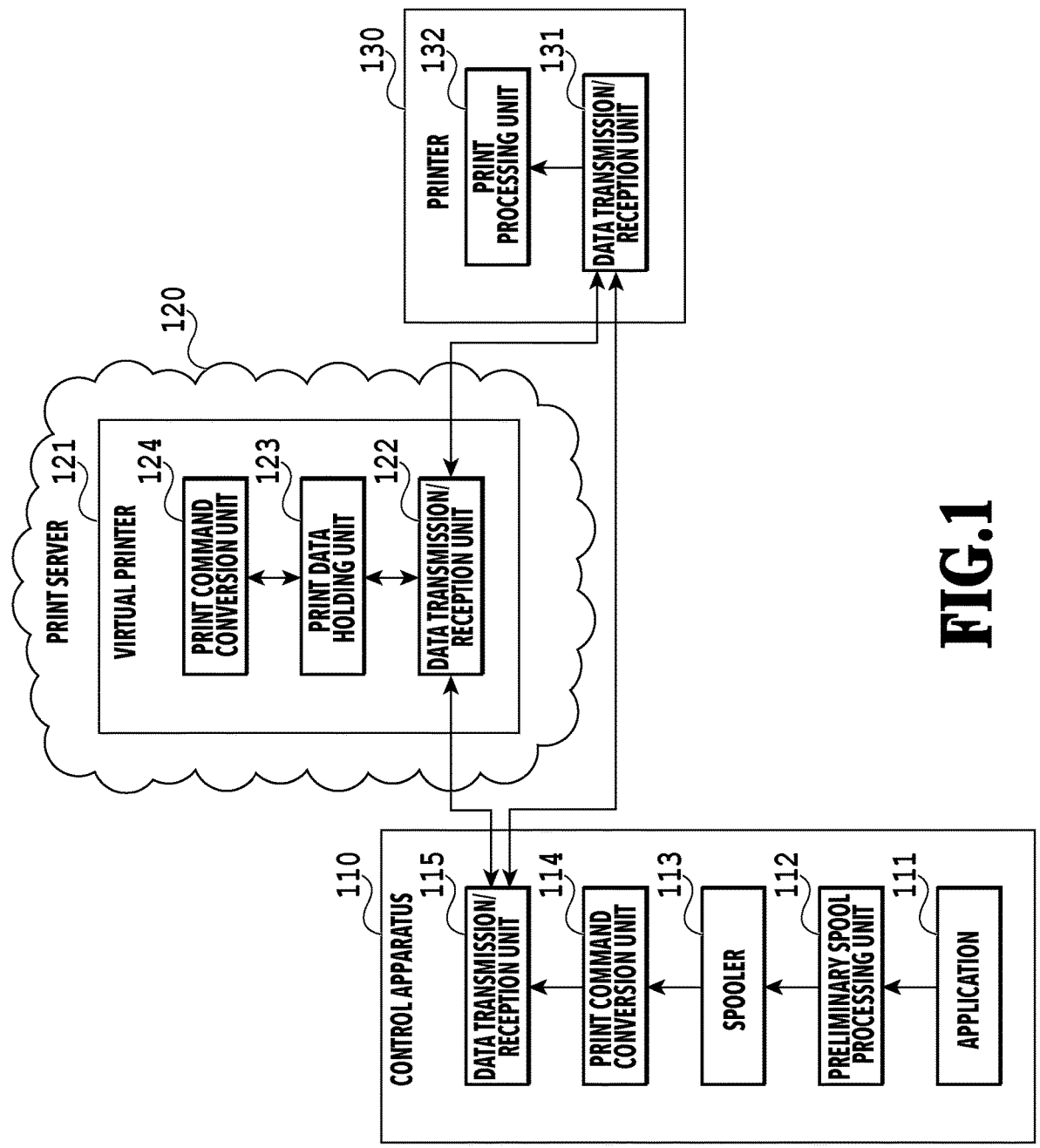
FIG. 1 is a block diagram illustrating a configuration example of a print system.

Preferable embodiments of the present disclosure are described below in detail with reference to the attached drawings. Note that the following embodiments do not limit the present disclosure and not all of combinations of characteristics described in the embodiments are necessary for solving means of the present disclosure.

First Embodiment

First, description is given of presence of a possibility that a user cannot appropriately select a printer suitable for printing in the case where a printer of a local print system (also referred to as local print) and a printer of a cloud print system (also referred to as cloud print) are registered in a control apparatus.

The local print system is built such that the control apparatus registers a printer on the control apparatus in response to a predetermined operation by a user and creates a print queue for the printer on the control apparatus. Then, a print instruction is transmitted from the control apparatus to the printer and printing is performed in the printer.

Meanwhile, the cloud print system is built such that a printer performs a registration process to a print server on the Internet in response to a predetermined operation by a user and the control apparatus creates a print queue for the printer on the control apparatus. Moreover, the control apparatus registers address information (transmission destination address) of a print queue created on the print server on the control apparatus to enable transmission of the print instruction from the control apparatus to the print server on the Internet. Then, the print server that has received the print instruction causes the printer to execute printing and the printing is thereby performed.

For example, a name for identifying the print queue such as a vendor name of the printer or a model name of the printer is assigned to the print queue created as described above and is registered in the control apparatus. The user designates the print queue registered in the control apparatus to instruct the printer corresponding to the designated print queue (that is the printer of the local print or the printer of the cloud print) to perform printing.

Assume a situation where print queues for the same printer are created on the control apparatus and the print server, respectively. In this case, the user is required to select a suitable print queue in consideration of a connection mode between the control apparatus and the printer. Specifically, there is a case where the control apparatus and the printer are not connected to each other via a LAN and are connected to the Internet. In this case, the user needs to give the print instruction while selecting the print queue on the print server as the destination on the control apparatus. Moreover, there is a case where the control apparatus or the printer is not connected to the Internet and the control apparatus and the printer are connected to each other via a LAN or a USB. In this case, the user needs to give the print instruction while selecting the print queue for the local print system as the destination on the control apparatus.

However, the user cannot necessarily select the print queue suitable for the connection mode. If the user selects the print queue not suitable for the connection mode between the control apparatus and the printer, there is a possibility that the print instruction does not properly reach the printer and the printing is not appropriately performed.

In the embodiment described below, description is given of a configuration in which the user can select a suitable print queue in a situation where print queues for the same printer may be created on the control apparatus and the print server, respectively. In the following description, a printer corresponding to the local print is sometimes referred to as local printer. Moreover, a printer registered in the print server is sometimes referred to as virtual printer.

<System Configuration>

FIG. 1 is a block diagram illustrating a configuration example of a print system in the embodiment. The print system of the embodiment includes a control apparatus 110, a print server 120, and a printer 130.

The control apparatus 110 includes an application 111, a preliminary spool processing unit 112, a spooler 113, a print command conversion unit 114, and a data transmission/reception unit 115. The application 111 creates data to be printed such as a picture, a document, and the like. The preliminary spool processing unit 112 temporarily holds the data created by the application 111 or performs processing on the held data before the data is inputted into the spooler 113. The spooler 113 receives the data from the preliminary spool processing unit 112 and manages the order of a print process. The print command conversion unit 114 converts the data received from the spooler 113 into a format interpretable by the printer 130. The data transmission/reception unit 115 transmits the command converted by the print command conversion unit 114 to a predetermined transmission destination.

The print server 120 is provided on the Internet. The print server 120 includes a virtual printer 121 associated with one physical printer (that is, the local printer). In the case where multiple physical printers are registered, the print server 120 includes multiple virtual printers 121. The virtual printer 121 includes a data transmission/reception unit 122, a print data holding unit 123, and a print command conversion unit 124. The data transmission/reception unit 122 performs communication with the data transmission/reception unit 115 of the control apparatus 110 or a data transmission/reception unit 131 of the printer 130. The print data holding unit 123 holds the received print data. The print command conversion unit 124 converts the print data to a predetermined format.

The printer 130 includes the data transmission/reception unit 131 and a print processing unit 132. The data transmission/reception unit 131 receives the print command interpretable by the printer 130 and transmits various pieces of information such as status information or device information of the printer to a communicating apparatus. The print processing unit 132 interprets the received print command and performs the print process.

<Hardware Configuration>

Figure 2:
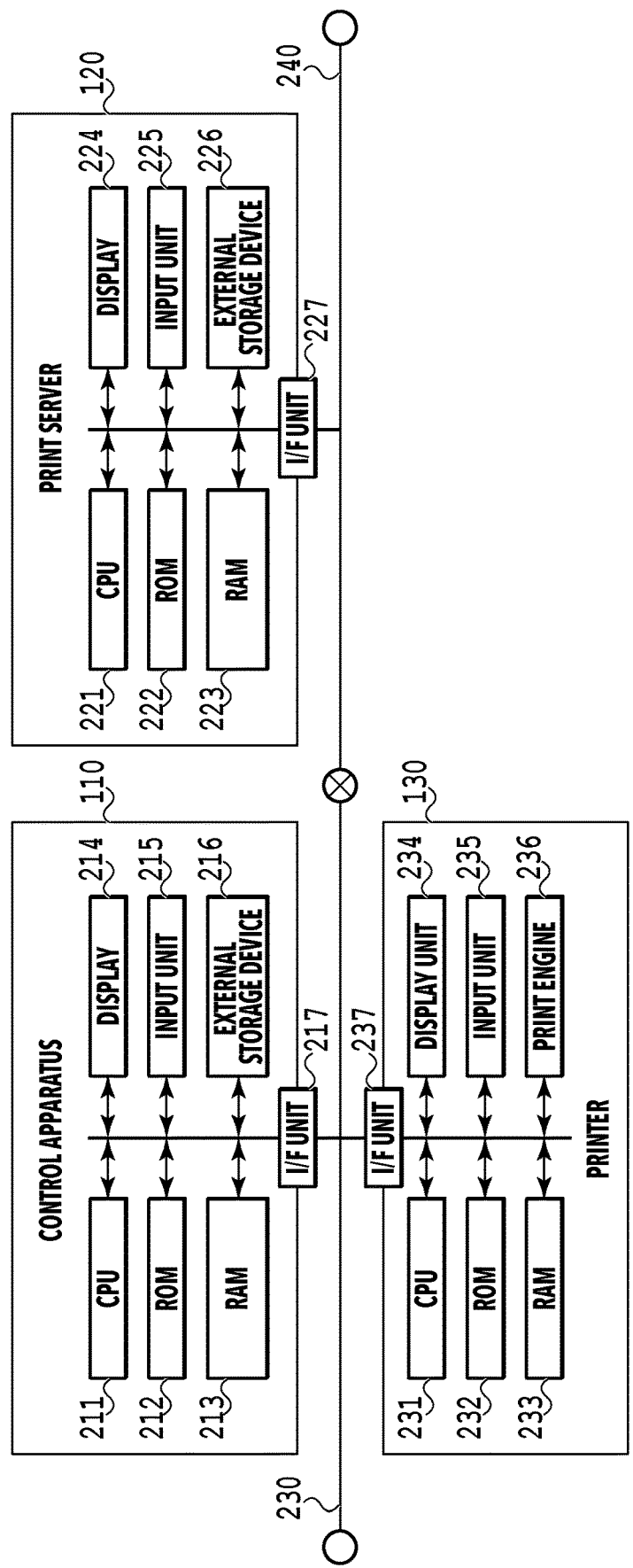
FIG. 2 is a block diagram illustrating a hardware configuration of the print system.

FIG. 2 is a block diagram illustrating a hardware configuration of the print system according to the embodiment. In the embodiment, description is given of an example of a print system in which the printer 130 and the control apparatus 110 being a host computer can communicate with each other via a communication bus 230 (network) such as the LAN. Although the LAN is assumed to be the connection mode of the network in this example, the connection mode may be a wide area network (WAN). Moreover, the connection mode of the network may be wired or wireless and wired connection and wireless connection may be provided in a mixed manner. Furthermore, the connection mode between the control apparatus 110 and the printer 130 may be USB. Although only one printer 130 is illustrated in the example of FIG. 2, any number of printers can be connected via the communication bus 230.

The print server 120 is, for example, a print server in a cloud and is configured to be capable of communicating with the control apparatus 110 and the printer 130 via the Internet 240 such as the WAN.

The control apparatus 110 is an example of an information processing apparatus. The control apparatus 110 includes a CPU 211, a ROM 212, a RAM 213, a display 214, an input unit 215, an external storage device 216, and an interface (I/F) unit 217. The control apparatus 110 in the embodiment is not limited to a desktop PC and may be a laptop PC, a tablet PC, or a mobile terminal such as a smartphone. Moreover, the display 214 may be provided outside the apparatus.

The control apparatus 110 can transmit an instruction for controlling the printer 130, the print data, setting commands, and the like to the printer 130. The CPU 211 is a central processing unit that controls the units of the control apparatus 110 and executes control programs such as an OS. The ROM 212 stores various programs such as the OS that controls system operations. The RAM 213 is a random access memory in which a work area used by the CPU 211 is expanded. The external storage device 216 stores various control programs such as an application.

The input unit 215 is an input device such as a keyboard or a mouse for operating the control apparatus 110. The display 214 is a display device that performs display for checking information received from the input unit 215, display of a user interface screen of the OS or the application, display of a notification screen such as a message, or the like. The I/F unit 217 is a communication module that transmits and receives data with the print server 120 and the printer 130.

The printer 130 being a printing apparatus is, for example, an inkjet printer. The printer 130 includes a CPU 231, a ROM 232, a RAM 233, a display unit 234, an input unit 235, a print engine 236, and an I/F unit 237. The CPU 231 is a central processing unit that controls the units of the printer 130. The ROM 232 is a read only memory and stores a program for controlling the print engine 236. The RAM 233 is a random access memory and temporarily stores a program necessary for an operation of the print engine 236 or setting values and the like received from the control apparatus 110 or the print server 120. The input unit 235 is a button and the like for operating the printer 130. The display unit 234 is a display device that performs display for checking information received from the input unit 235, display of a status message of the printer 130, or the like.

The print engine 236 performs printing on a recording medium based on the print data sent from the control apparatus 110 or the print server 120. The I/F unit 237 is a communication module that receives the print data from the control apparatus 110 or the print server 120, and has functions such as transmitting the current status information of the printer 130 from the printer 130 to the control apparatus 110 or the print server 120. The status information herein is status data indicating the state of the printer 130 that the printer 130 can send back in response to a request from the control apparatus 110 or the print server 120 connected via the I/F unit 237. The status data is information for notifying an operation state of the printer 130 such as "printing" or "waiting state" and an error state of the printer 130 such as "paper out", "cover is open", or "no ink left".

The print server 120 includes a CPU 221, a ROM 222, a RAM 223, a display 224, an input unit 225, an external storage device 226, and an I/F unit 227. The print server 120 is configured to be communicable with the control apparatus 110 and the printer 130 via the Internet 240. Configurations of the units of the print server 120 may be the same as the examples described in the configurations of the control apparatus 110 and description thereof is thus omitted herein.

<Registration Process of Printer>

Figure 3:
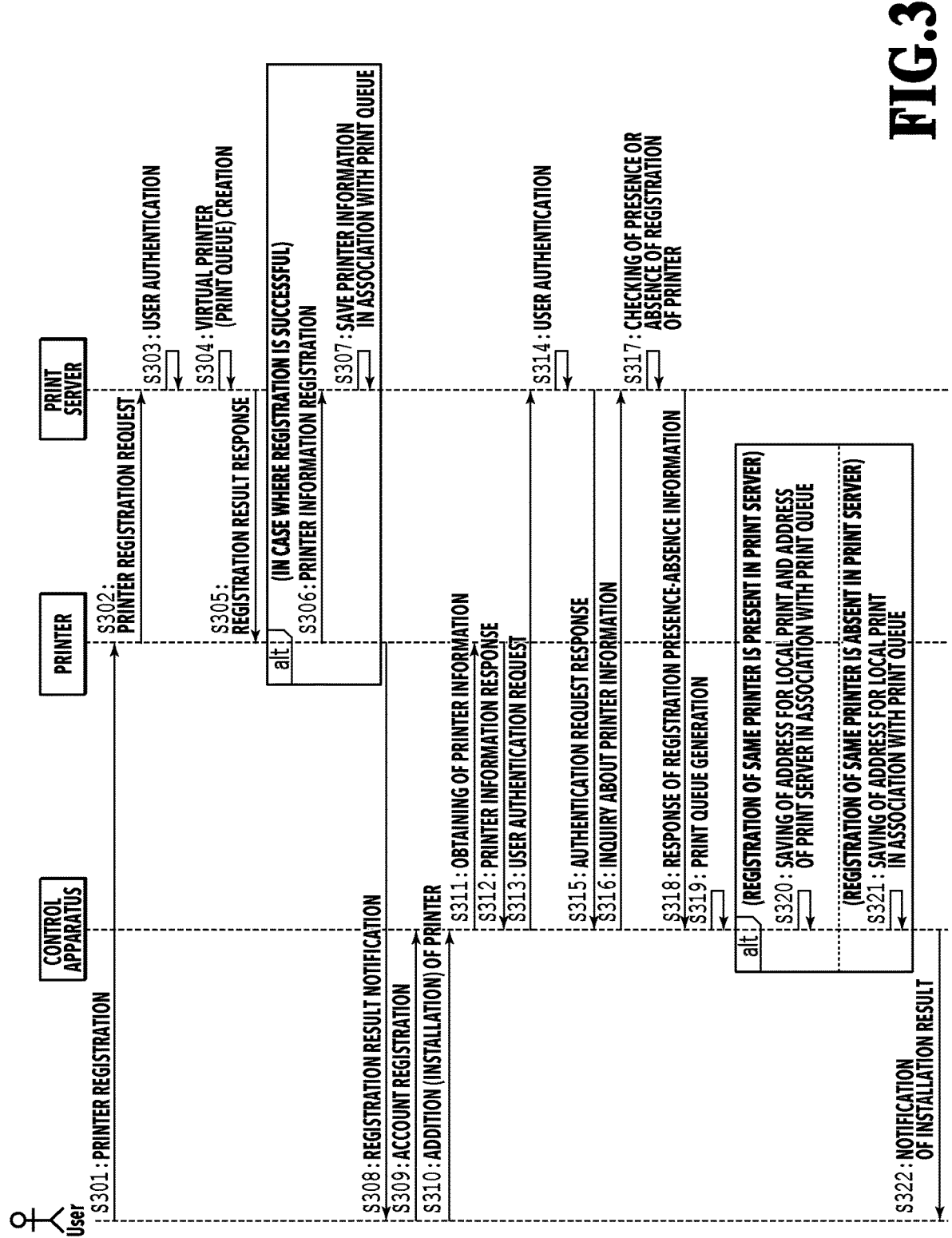
FIG. 3 is a sequence diagram illustrating an example of a process of registering a printer in a control apparatus.

FIG. 3 is a sequence diagram illustrating an example of a process of registering the printer 130 in the control apparatus 110 in the embodiment. As described above, generally, in the case where the same printer is registered in the local print system and the cloud print system, the print queues are created in the respective print systems. In the embodiment, even in the case where the same printer is registered in the local print system and the cloud print system, a single (common) print queue is created. Description is given below with reference to the sequence diagram of FIG. 3.

Note that, in the sequence diagram in FIG. 3, a process performed by the control apparatus 110 is performed such that the CPU 211 of the control apparatus 110 loads a program code stored in the ROM 212 onto the RAM 213 and executes the program code. A process performed by the printer 130 is performed such that the CPU 231 of the printer 130 loads a program code stored in the ROM 232 onto the RAM 233 and executes the program code. A process performed by the print server 120 is performed such that the CPU 221 of the print server 120 loads a program code stored in the ROM 222 onto the RAM 223 and executes the program code. Note that the sign "S" in the description of each process means step in the corresponding flowchart. This also applies to the other sequence diagrams and flowcharts in the specification.

The sequence of FIG. 3 is an example of a process in which the user first registers the printer 130 in the print server 120 and then registers the printer 130 in the local print system in which the control apparatus 110 belongs.

First, in S301, the user operates the main body of the printer 130 to start a registration process of registering the printer 130 in the print server 120. Specifically, in S301, the printer 130 performs a reception process of receiving an instruction of a process of registering the printer 130 in the print server 120 from the user. As an example of the printer operation, there is a method in which the user inputs account information that allows access to the print server 120, on a touch panel provided in the printer 130 to perform an operation of registering the printer 130 in the print server 120.

In S302, the printer 130 that has received the registration instruction from the user issues a printer registration request including the inputted account information, to the print server 120. In S303, the print server 120 refers to the account information included in the printer registration request and performs a user authentication process. In the case where the user authentication process is normally completed, in S304, the print server 120 generates a virtual printer (print queue) corresponding to the printer 130 that has issued the registration request, in the server. Thereafter, in S305, the print server 120 sends a registration result as a response to the printer 130.

In the case where the registration result indicates success, in S306, the printer 130 that has received the registration result registers printer information in the print server 120. The printer information registered herein may include various pieces of information such as information uniquely identifying the printer (serial number or the like), a product name of the printer, and information indicating a printer state. In S307, the print server 120 that has received the printer information saves the received printer information in the server in association with the virtual printer created in S304. Moreover, the print server 120 sends a registration result of the printer information as a response to the printer 130.

In S308, the printer 130 that has received the registration result of the printer information notifies the registration result to the user. Examples of a method of notification to the user include a method of displaying the registration result on the touch panel provided in the printer 130. The subsequent processes are described assuming that the printer registration process from S301 to S308 is normally completed.

Next, in S309, the user who has checked the printer registration result registers account information for access to the print server 120 in the control apparatus 110. Specifically, the control apparatus 110 receives input of the account information from the user. Then, in S310, the user executes a registration process of the printer 130 on the control apparatus 110. Specifically, in S310, the control apparatus 110 receives an instruction of an addition process (install process) of adding the printer to be registered, from the user. In S310, the user performs a process of adding the printer of the local print. In the case where the registration process is instructed, in S311, the control apparatus 110 transmits a request for the printer information to the printer 130 and, in S312, the printer 130 sends the printer information as a response to the control apparatus 110 in response to the request. The control apparatus 110 thereby obtains the printer information from the printer 130. The printer information obtained by the control apparatus 110 may include various pieces of information such as the information uniquely identifying the printer (serial number and the like), a transmission destination address of the print data (address for local print), the product name of the printer, and the information indicating the printer state. The transmission destination address is described in, for example, uniform resource identifier (URI).

In S313, the control apparatus 110 issues a user authentication request to the print server 120 based on the account information registered in S309. In S314, the print server 120 that has received the user authentication request performs an authentication process based on the received information. Then, in S315, the print server 120 sends the result of the process as a response to the control apparatus 110. The subsequent processes are described assuming that the user authentication process from S313 to S315 is normally completed.

Next, in S316, the control apparatus 110 obtains the information uniquely identifying the printer from the printer information obtained in S312 and makes an inquiry to the print server 120 about presence or absence of registration of this printer based on the obtained information. Specifically, the control apparatus 110 transmits an inquiry based on the printer information to the print server 120. In S317, the print server 120 that has received the inquiry about the presence or absence of the registration checks the printer information associated with the virtual printer managed in the print server 120. Then, the print server 120 checks whether the printer identified from the printer information designated by the control apparatus 110 is registered in the print server 120. Thereafter, in S318, the print server 120 sends registration presence-absence information obtained by the checking as a response to the control apparatus 110. In the case where the printer designated by the control apparatus 110 is registered in the print server 120, the information sent as a response in S318 includes the address information of the virtual printer corresponding to the designated printer that is managed on the print server. The address information is described in, for example, URI.

In S319, the control apparatus 110 that has obtained the registration presence-absence information generates a print queue on the control apparatus 110. In the sequence of FIG. 3, the subsequent processes of the control apparatus 110 changes depending on the registration presence-absence information.

First, description is given of the case where the information received in S318 includes the address information of the virtual printer on the print server. In this case, in S320, the control apparatus 110 saves the address for the local print and the address of the virtual printer on the print server in a predetermined area in the control apparatus 110, in association with the print queue created in S319. Specifically, the control apparatus 110 manages multiple addresses that are transmission destinations of the print data in the control apparatus 110, in association with the print queue created in S319.

Next, description is given of the case where the information received in S318 includes no address information of the virtual printer on the print server. In this case, in S321, the control apparatus 110 saves the address for the local print in a predetermined area in the control apparatus 110, in association with the print queue created in S319. Specifically, the control apparatus 110 manages one address that is the transmission destination of the print data in the control apparatus 110, in association with the print queue created in S319.

After at least one predetermined address is associated with the print queue in S320 or S321 as described above, in S322, the control apparatus 110 notifies the result of the registration process to the user. The result notified to the user includes information indicating presence or absence of association of the address of the virtual printer on the print server 120 with the print queue created on the control apparatus 110.

That is the example of the process in which the user registers the printer 130 in the print server 120 and then registers the printer 130 in the local print system to which the control apparatus 110 belongs. The aforementioned process allows the address information for the local print and the address information of the virtual printer on the print server to be simultaneously managed in one print queue created on the control apparatus 110.

Figure 4:
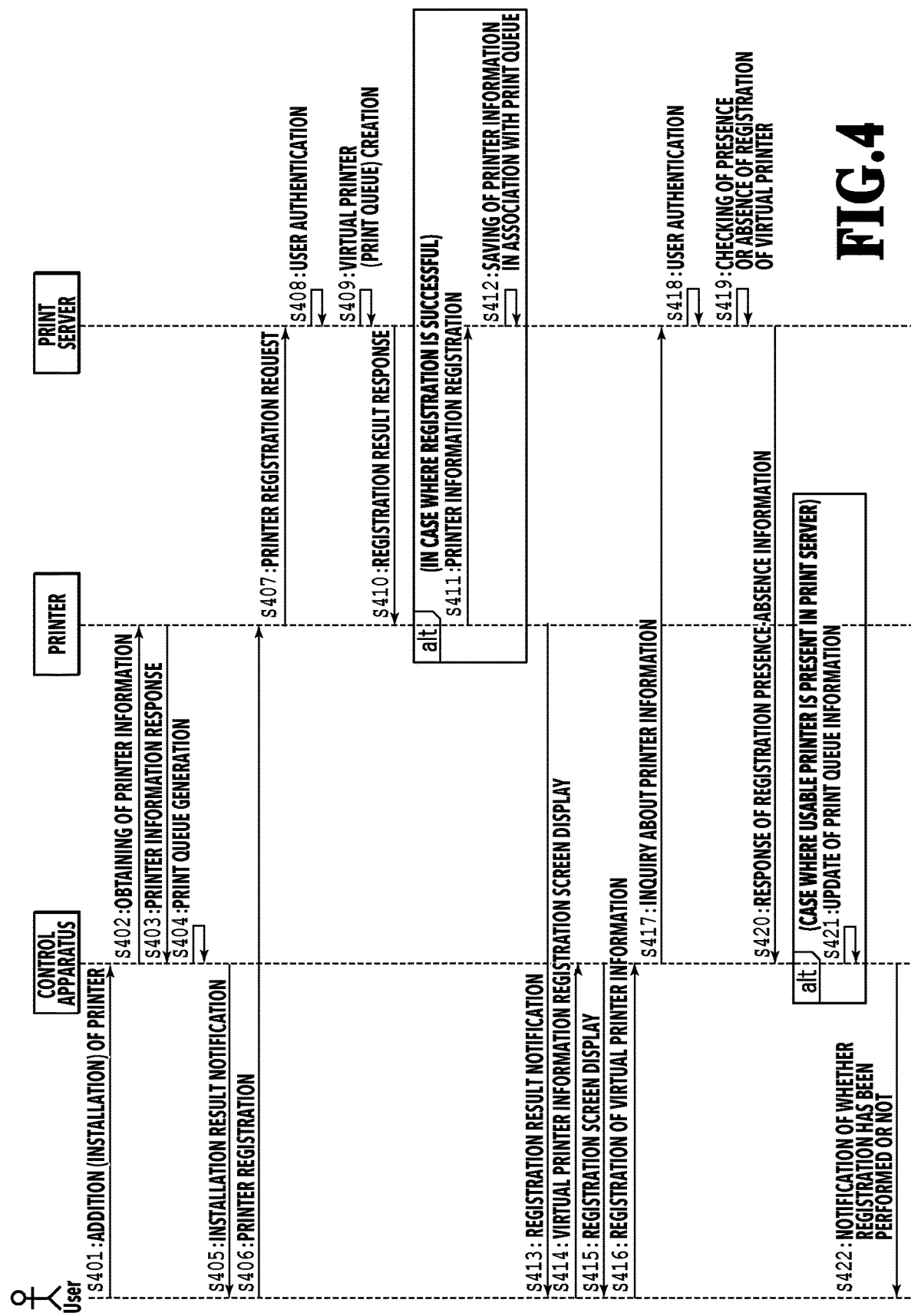
FIG. 4 is a sequence diagram illustrating an example of a process of registering the printer in the control apparatus.

FIG. 4 is a sequence diagram illustrating an example of another process of registering the printer 130 in the control apparatus 110 in the embodiment. In FIG. 4, description is given of an example of a process in which the user registers the printer 130 in the local print system to which the control apparatus 110 belongs, and then registers the printer 130 in the print server 120. Note that description of the same processes as those in FIG. 3 is partially omitted in some cases. First, in S401, the user executes the registration process of the printer 130 on the control apparatus 110. Specifically, in S401, the control apparatus 110 receives an instruction of executing the registration process from the user. The control apparatus 110 obtains the printer information from the printer 130 (S402 to S403). S402 to S403 are the same processes as S311 to S312 in FIG. 3. The printer information obtained herein may also include various pieces of information such as the information uniquely identifying the printer (serial number and the like), the transmission destination address of the print data, the product name of the printer, and the information indicating the printer state as described above. In S404, the control apparatus 110 that has obtained the printer information generates a print queue on the control apparatus 110 and associates the address for the local print with the generated print queue. Then, in S405, the control apparatus 110 notifies the result of the registration process to the user. The print queue for the local print is thereby generated.

Next, in S406, the user operates the main body of the printer 130 to start the registration process of registering the printer 130 in the print server 120. Specifically, in S406, the printer 130 receives an instruction of the process of registering the printer 130 in the print server 120 from the user. In S407, the printer 130 that has received the registration instruction from the user issues the printer registration request including the account information inputted by the user, to the print server 120. In S408, the print server 120 refers to the account information included in the printer registration request and inputted into the printer 130 by the user and performs the user authentication process. In the case where the user authentication process is normally completed, in S409, the print server 120 generates the virtual printer corresponding to the printer that has issued the printer registration request, in the server. Specifically, the print server 120 generates the print queue of the virtual printer in the print server 120. In S410, the print server 120 sends the printer registration result as a response to the printer 130.

In the case where the printer registration result indicates success, in S411, the printer 130 that has received the printer registration result registers the printer information in the print server 120. The printer information registered in the print server 120 herein may include various pieces of information such as the information uniquely identifying the printer (serial number and the like), the product name of the printer, and the information indicating the printer state as described above. In S412, the print server 120 that has received the printer information saves the received printer information in association with the virtual printer (print queue) created in S409. Then, the print server 120 transmits the registration result to the printer 130.

In S413, the printer 130 that has received the registration result of the printer information from the print server 120 notifies the registration result to the user. Note that the result notified to the user includes the address of the virtual printer (print queue) created on the print server in S409.

In S414, the user who has received the notification of the registration result instructs the control apparatus 110 to display a registration screen of the virtual printer information. Specifically, in S414, the control apparatus 110 receives an instruction of displaying the registration screen of the virtual printer information from the user. In S415, the control apparatus 110 that has received the instruction displays the registration screen of the virtual printer information for the user.

Figure 5:
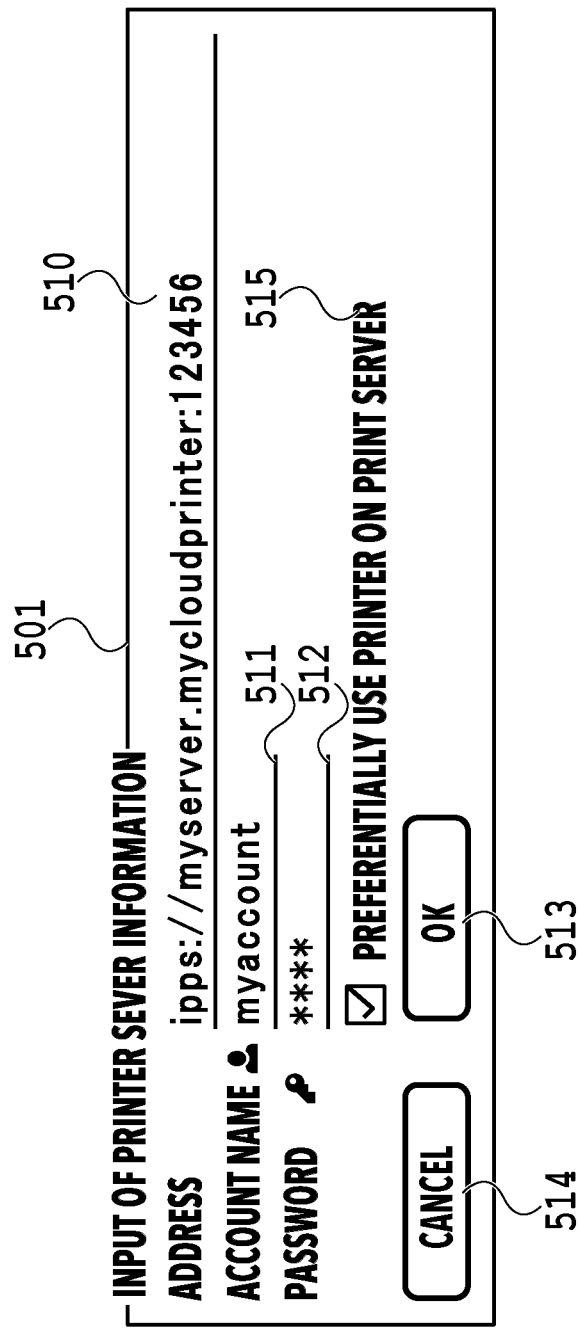
FIG. 5 is a view illustrating an example of a registration screen of virtual printer information.

FIG. 5 is a view illustrating an example of the registration screen 501 of the virtual printer information displayed on the display 214 by the control apparatus 110. Items for inputting an address 510 indicating the virtual printer on the print server 120 and account information 511 and a password 512 for accessing the print server 120 are provided on the registration screen 501 as input items. In the case where the user inputs predetermined information in each input field and presses an OK button 513, the control apparatus 110 transmits the inputted information to the print server 120. In the case where the user presses a cancel button 514, the control apparatus 110 does not transmit the information to the print server 120 even if the address, the account information, or the like is inputted, and terminates the display of the registration screen 501.

Moreover, an item 515 for selecting a printer to be preferentially used by an operation of the user is provided on the registration screen 501. The registration screen 501 of FIG. 5 is configured such that the user can determine whether the "printer on the print server is preferentially used" or not by providing or not providing a check in a check box that is the item 515. In the case where the user provides a check in the check box by selecting the item 515, the control apparatus 110 performs control such that the printer (virtual printer) registered in the print server 120 is preferentially used in the execution of the print process. Moreover, the pressing of the OK button 513 by the user causes information on presence or absence of a check in the item 515 to be recorded in a predetermined shared storage area in the RAM 213 in the control apparatus 110 or the like.

Returning to the description of FIG. 4, in S416, the user registers the virtual printer information on the registration screen displayed in S415. In this case, the user registers the virtual printer information that includes the address of the virtual printer created on the print server in S409 and the account information for authentication, on the registration screen 501 and presses the OK button, the address notified in S413. Specifically, in S416, the control apparatus 110 receives the registration instruction of the printer information through the registration screen 501.

In S417, the control apparatus 110 that has received the instruction of information registration transmits the registered printer information to the print server 120 and makes an inquiry of presence or absence of registration of the printer. In S418, the print server 120 that has received the inquiry of presence of absence of the registration of the printer information refers to the account information included in the printer registration request and inputted by the user on the control apparatus 110 and performs the user authentication process. Note that the subsequent processes are described assuming that the user authentication of S418 has been successful. Next, in S419, the print server 120 checks the printer information associated with the virtual printer managed in the print server 120. Moreover, the print server 120 checks whether the printer designated by the control apparatus 110 is registered in the print server 120. In S420, the print server 120 sends the registration presence-absence information of the checked printer as a response to the control apparatus 110.

In the case where the information received in S420 indicates presence of the registration, in S421, the control apparatus 110 saves the address of the virtual printer created on the print server that is newly notified in S420 in association with the print queue created in S404. Thereafter, in S422, the control apparatus 110 notifies the result of the registration process from S417 to S421 to the user.

The aforementioned process allows the printer to be managed in one print queue created on the control apparatus 110 even in the case where the printer for local print is registered in the control apparatus 110 and then the same printer is registered in the print server 120. Specifically, the address information for the local print and the address information on the print server can be simultaneously managed in one print queue created on the control apparatus 110.

Although description is given above of the example in which the screen including the item through which the user can designate whether to preferentially use the printer (virtual printer) registered in the print server 120 is displayed in the displaying of the registration screen in S415 of FIG. 4, the present disclosure is not limited to this. The control apparatus 110 may display a screen through which the user can designate whether to preferentially use the printer (virtual printer) registered in the print server 120, also in the process of the flowchart of FIG. 3. For example, in the case where the control apparatus 110 notifies the installation result in S322, the control apparatus 110 may display the screen through which the user can designate whether to preferentially use the printer (virtual printer) registered in the print server 120.

<Print Process of Printer>

Figure 6B:
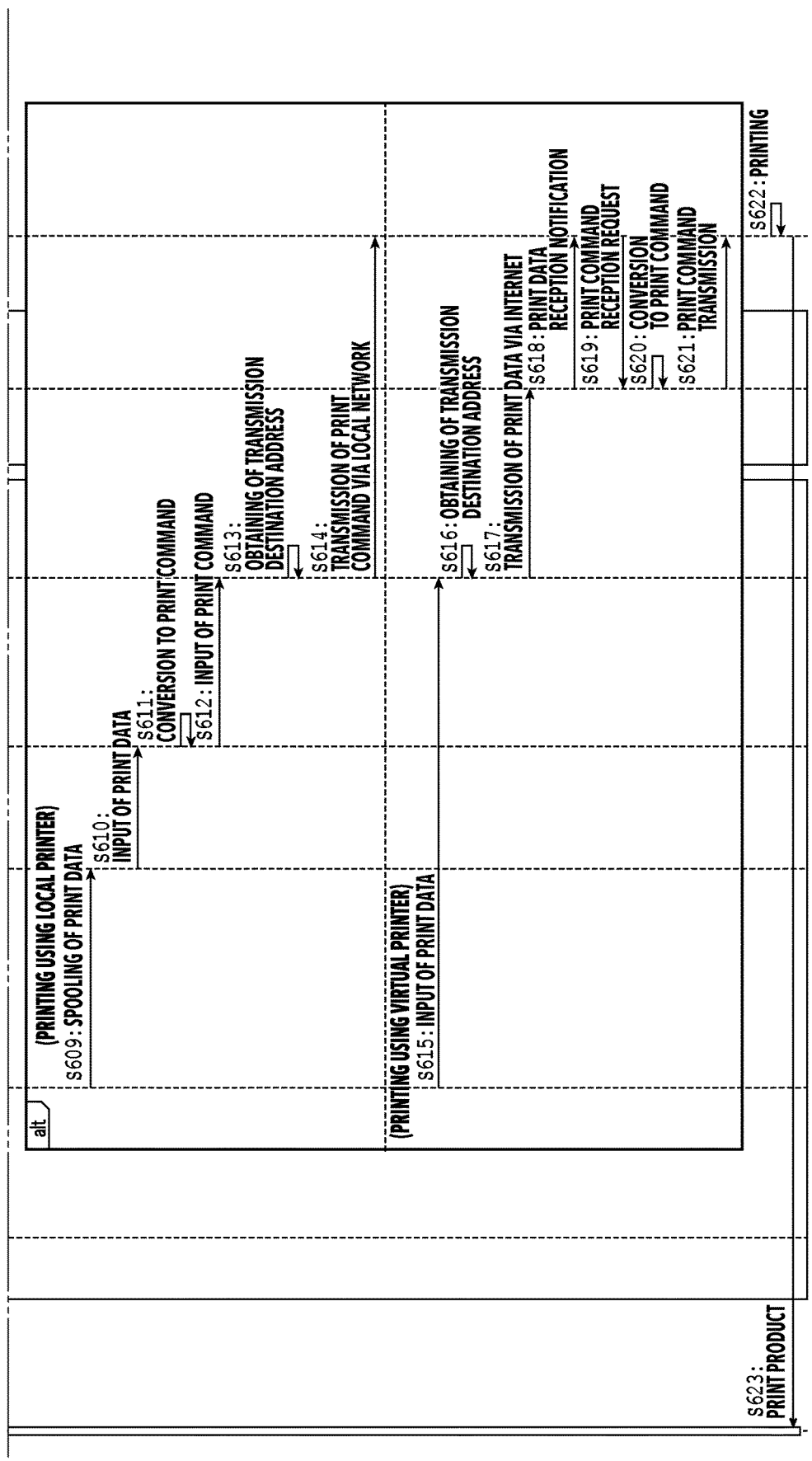

FIGS. 6A and 6B are together a sequence diagram illustrating an example of the print process in the embodiment. First, in S601, the user causes a printer selection screen to be displayed on the application 111 and selects a printer (print queue) to execute the print process to print desired data such as a picture, a document, or the like by using the application 111. Specifically, the application 111 of the control apparatus 110 displays the printer selection screen on the display 214 in response to reception of a display instruction of the printer selection screen from the user, and receives selection of the printer.

Figure 7:
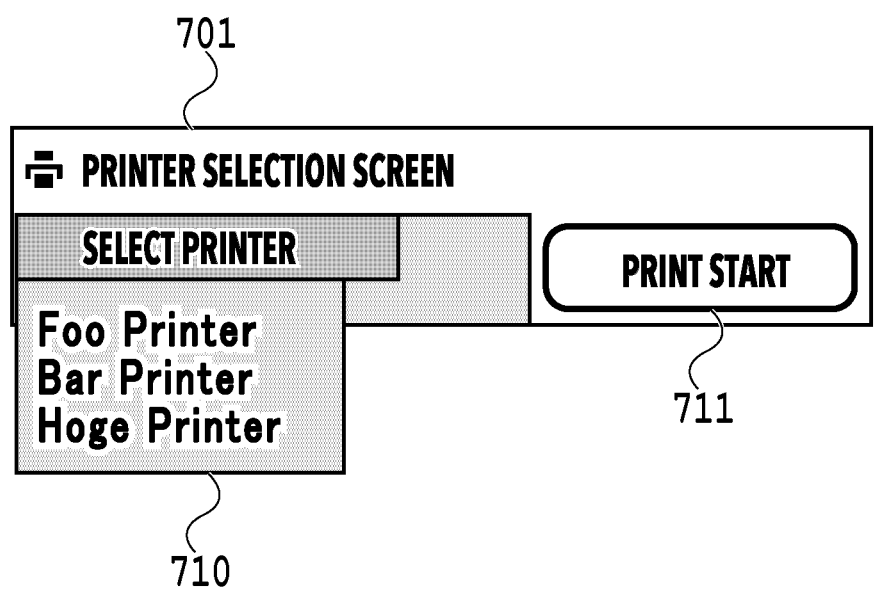
FIG. 7 is a diagram illustrating an example of a printer selection screen.

FIG. 7 is a diagram illustrating an example of the printer selection screen 701 displayed on the display 214 by the application 111. A print start button 711 and a display item 710 in a format of a list of selectable printers are arranged on the printer selection screen 701. The print queues are displayed as the selectable printers. The user can select one printer (print queue) to execute the print process from the display item 710 and press the print start button 711 to start the print process for the designated printer (print queue). Note that, since the registration process described in FIG. 3 or 4 is performed in the embodiment, no multiple print queues of the different print paths for the same printer are displayed in the list of the selectable printers.

The description continues while returning to FIG. 6A. In S602, the user instructs the application 111 to execute the print process on the printer selection screen 701. Specifically, in S602, the application 111 receives an instruction of executing the print process. In S603, the application 111 that has received the instruction of executing the print process inputs the print data into the preliminary spool processing unit 112. The inputted print data includes information on the print queue designated by the user in S601. In S604, the preliminary spool processing unit 112 that has received the print data checks the transmission destination address associated with the printer (print queue) designated by the user in S601. As described above, in the embodiment, there is a case where the address information for the local print and the address information on the print server are associated with one print queue.

In the case where the preliminary spool processing unit 112 determines that the two addresses of the local printer and the virtual printer are associated with the printer (print queue) designated by the user in S604, the preliminary spool processing unit 112 performs a process of S605. In S605, the preliminary spool processing unit 112 obtains information on a network environment. Specifically, the preliminary spool processing unit 112 obtains information on the network environment in which the control apparatus 110 is currently participating. In this case, the information on the network environment includes information such as an IP address and a subnet mask of the control apparatus 110.

In S605, the preliminary spool processing unit 112 refers to the shared save area in the control apparatus 110 to refer to the registration presence-absence information of the preferentially-used printer set by the user. The registration presence-absence information of the preferentially-used printer is preferential information indicating whether preferential use of the virtual printer is selected by the user in the item 515 in the registration screen 501 illustrated in FIG. 5. In S607, the preliminary spool processing unit 112 determines to which one of the local printer and the virtual printer the print data is to be transmitted based on the information obtained in S605 and S606. Specifically, the preliminary spool processing unit 112 determines a transmission path used to transmit the print data to the printer 130 that is the same printer.

Examples of the determination include a method of determining whether the control apparatus 110 and the printer 130 belong to the same network from the IP address and the subnet mask of the control apparatus 110 and the address information of the printer 130. Then, there is a method in which the print data is determined to be transmitted to the address of the local printer in the case where the control apparatus 110 and the printer 130 belong to the same network. Alternatively, there is a method in which the virtual printer is determined to be used in the case where the control apparatus 110 and the printer 130 belong to the same network but the user has given the instruction of the preferential use of the virtual printer. Moreover, there is a method in which access from the control apparatus 110 to the address of the local printer is attempted in advance and the print data is determined to be transmitted to the address of the local printer in the case where the access is successful.

Thereafter, in S608, the preliminary spool processing unit 112 saves the address that is determined in S607 and to which the print data is to be transmitted, in a predetermined area. Note that the area in which the address is saved in S608 is an area accessible also by the data transmission/reception unit 115. The process subsequent to S609 branches depending on the determination result of S607.

First, description is given of a process in the case where the preliminary spool processing unit 112 determines that the print data is to be transmitted to the address of the local printer in S607. In S609, the preliminary spool processing unit 112 inputs the print data into the spooler 113. In S610, the spooler 113 that has received (spooled) the print data inputs the received print data into the print command conversion unit 114. In S611, the print command conversion unit 114 that has received the print data starts a conversion process of converting the received print data to a print command format interpretable by the printer 130. In the case where generation of the print command in the process of S611 starts, in S612, the print command conversion unit 114 inputs the generated print command into the data transmission/reception unit 115 as the command is generated. In S613, the data transmission/reception unit 115 that has received the print command first refers to the information saved by the preliminary spool processing unit 112 in S608 and obtains the transmission destination address of the print command. Then, the data transmission/reception unit 115 transmits the print command to the printer 130 via the local network for the obtained transmission destination address. In S622, the printer 130 that has received the print command performs the print process according to the print command and provides a print product to the user.

Next, description is given of a process in the case where the preliminary spool processing unit 112 determines to transmit the print data to the address of the virtual printer 121 in S607. In S615, the preliminary spool processing unit 112 directly inputs the received print data into the data transmission/reception unit 115 without subjecting the received print data to the spool process of the spooler 113 and the print command conversion process of the print command conversion unit 114. In the case where the printing is to be performed via the virtual printer 121, the conversion process to the print command is performed by the print command conversion unit 124 in the print server 120. Accordingly, the conversion process to the print command does not have to be performed in the control apparatus 110. Meanwhile, in the case where the print data is inputted into the spooler 113, the print command generation process by the subsequent print command conversion unit 114 is performed. Thus, in the case where the virtual printer 121 is to be used, the spool process of the spooler 113 and the print command conversion process of the print command conversion unit 114 are omitted. Accordingly, in the case where the print data is to be transmitted to the address of the virtual printer 121, the preliminary spool processing unit 112 inputs the received print data into the data transmission/reception unit 115 without causing the print data to pass through the spooler 113 and the print command conversion unit 114.

In S616, the data transmission/reception unit 115 that has received the print data refers to the information saved by the preliminary spool processing unit 112 in S608 and obtains the transmission destination address of the print command. Thereafter, in S617, the data transmission/reception unit 115 transmits the print data to the obtained transmission destination address. Specifically, the data transmission/reception unit 115 transmits the print data to the virtual printer 121 on the print server 120 via the Internet. In S618, the virtual printer 121 that has received the print data notifies the reception of the print data to the printer 130 associated with the virtual printer. In S619, the printer 130 that has received the reception notification of the print data issues a print command reception request, to the virtual printer 121. In this case, the print command reception request includes information on the format of the print command interpretable by the printer 130. In S620, the virtual printer 121 that has received the print command reception request executes a conversion process of converting the print data received in S617 to the print command format included in the print command reception request received in S619. After the completion of the conversion process, in S621, the virtual printer 121 transmits the generated print command to the printer 130. In S622, the printer 130 that has received the print command performs the print process according to the print command and provides a print product to the user.

The aforementioned process allows the control apparatus 110 to automatically select an appropriate address to which the print data or the print command is to be transmitted, based on the information on the network environment to which the control apparatus 110 belongs. The user can thereby perform desired printing by selecting a printer (print queue) desired to execute the print process without considering the network environment in which the control apparatus 110 belongs.

Note that, in the case where only one of the address of the local printer and the address of the virtual printer is associated with the printer designated by the user in S604, the control apparatus 110 does not execute the process from S605 to S608. Moreover, the control apparatus 110 executes one of the print process for the local printer (S609 to S614) and the print process for the virtual printer (S615 to S621).

Note that, in the embodiment, description is given assuming that the control apparatus 110 and the printer 130 are connected to each other via the local area network. Specifically, description is given assuming that the connection mode is a mode in which the control apparatus 110 and the printer 130 are connected to other devices such as a router and a switcher forming the local area network. However, the connection mode between the control apparatus 110 and the printer 130 may be other connection modes such as a serial port or USB. Moreover, in the case where the control apparatus 110 and the printer 130 are connected to each other by two or more interfaces, an appropriate interface may be selected depending on the characteristics of the interfaces. For example, in the case where the control apparatus 110 and the printer 130 are connected to each other by the interfaces of the network and USB, a method in which the data transfer rates of the two interfaces are compared and the interface with the higher transfer rate is selected is conceivable.

As described above, according to the embodiment, the user can perform printing by using a printer suitable for the printing. In the embodiment, the print queue common to the control apparatus 110 and the print server 120 is created as the print queue for the same printer. This can suppress occurrence of various problems caused by selection of an unsuitable print queue by the user in the case where print queues may be created respectively for the control apparatus 110 and print server 120.

Second Embodiment

In the first embodiment, description is given of the example in which only one print queue for the same printer is registered in the control apparatus 110. In the present embodiment, description is given of an example of a process in the case where print queues for the same printer are created in the control apparatus 110 and the print server 120, respectively, and are registered in the control apparatus 110.

In the embodiment, description is given of an example in which the application 111 determines whether the printer (print queue) selected by the user can be used or not and, in the case where the printer that cannot be used is selected, gives notification of prompting use of a suitable printer. Specifically, before the print data is transmitted from the application 111 to the spooler 113 activated in the control apparatus 110, the application 111 determines whether the printer (print queue) selected by the user can be used or not.
<Registration Process of Printer>

Figure 8:
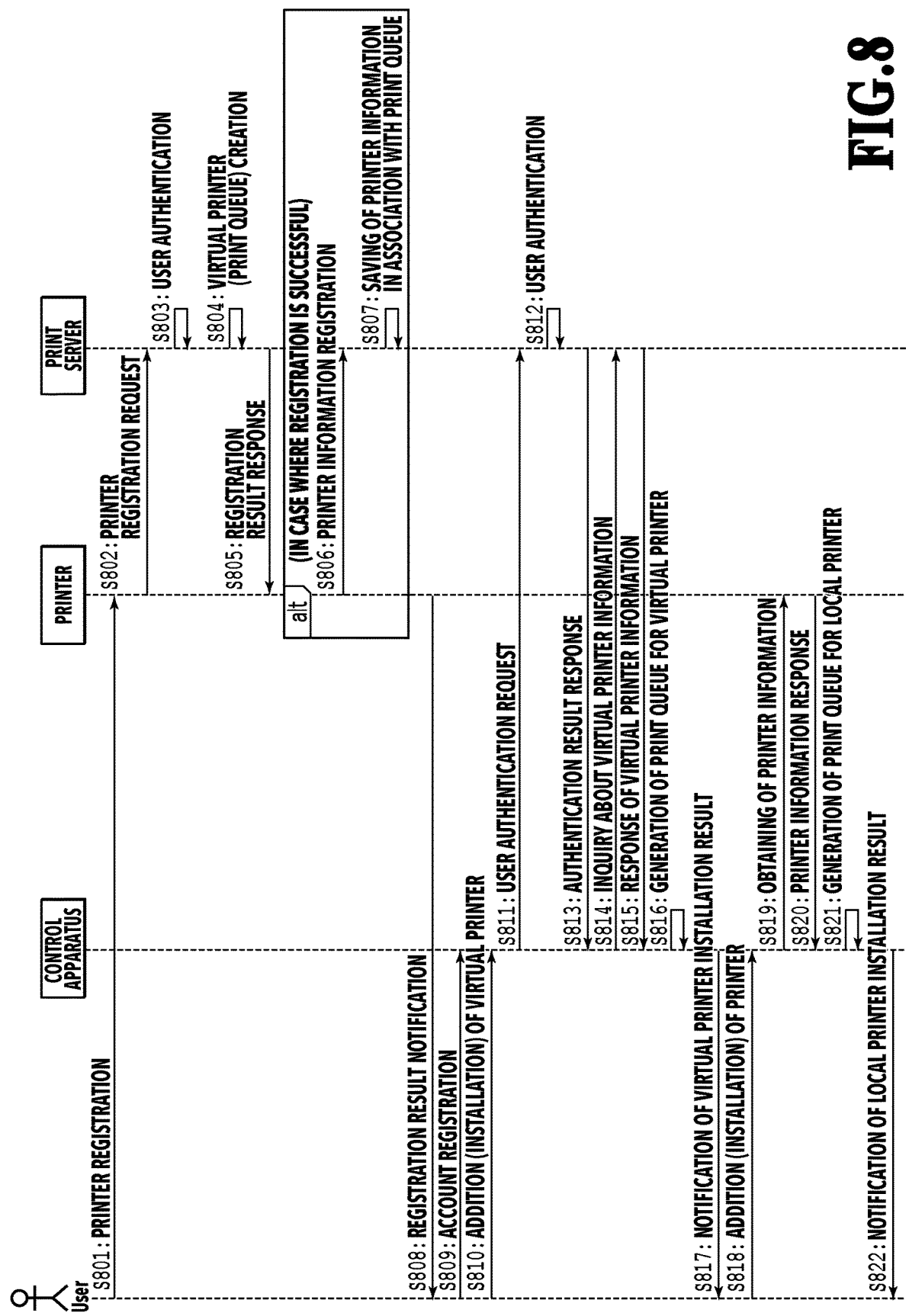
FIG. 8 is a sequence diagram illustrating an example of the process of registering the printer in the control apparatus.

FIG. 8 is a sequence diagram illustrating an example of a process of registering the printer 130 in the control apparatus 110 in the embodiment. In the embodiment, description is given of a registration process of registering the local printer and the virtual printer in the control apparatus 110. In FIG. 8, a process sequence in which the user registers the virtual printer and then registers the local printer is described as an example. However, there may be performed a process sequence in which the user registers the local printer and then registers the virtual printer.

First, in S801, the user operates the main body of the printer 130 to start the registration process of registering the printer 130 in the print server 120. Specifically, in S801, the printer 130 receives the instruction of the addition process (process of installation) of adding the printer 130 in the print server 120 from the user. An example of the printer operation is the same as the example described in the first embodiment. In S802, the printer 130 that has received the registration instruction from the user issues the printer registration request including the inputted account information, to the print server 120. Thereafter, in S803, the print server 120 refers to the account information included in the printer registration request and performs the user authentication process. In the case where the user authentication process is normally completed, in S804, the print server 120 generates the virtual printer (print queue) corresponding to the printer that has issued the registration request, in the server. In S805, the print server 120 sends the registration result as a response to the printer 130. In the case where the registration result indicates success, in S806, the printer 130 that has received the registration result registers the printer information in the print server 120. The printer information registered herein is the same as the example described in the first embodiment. In S807, the print server 120 that has received the printer information saves the received printer information in association with the virtual printer created in S804. Then, the print server 120 transmits the registration result to the printer 130.

In S808, the printer 130 that has received the registration result notifies the registration result to the user. Examples of a notification method to the user include a method of displaying the registration result on the touch panel provided in the printer 130. The subsequent processes are described assuming that the printer registration process from S802 to S807 is normally completed.

In S809, the user who has checked the printer registration result registers the account information for access to the print server 120 in the control apparatus 110. Specifically, in S809, the control apparatus 110 receives the registration of the account information for access to the print server 120 from the user. Then, in S810, the user executes the registration process of the virtual printer 121 on the control apparatus 110. Specifically, in S810, the control apparatus 110 receives an instruction of executing the registration process of the virtual printer 121 from the user. In S811, the control apparatus 110 issues the user authentication request to the print server 120 based on the account information registered in S809. In S812, the print server 120 that has received the user authentication request performs the authentication process based on the received information. Then, in S813, the print server 120 sends the result of the authentication process as a response to the control apparatus 110. The subsequent processes are described assuming that the user authentication process from S811 to S813 is normally completed.

Next, in S814, the control apparatus 110 makes an inquiry to the print server 120 about the virtual printer information. In S815, the print server 120 that has received the inquiry sends the virtual printer information as a response to the control apparatus 110. In this case, the virtual printer information may include various pieces of information such as the transmission destination address of the print data, the product name of the printer, and the information indicating the printer state. In S816, the control apparatus 110 that has obtained the virtual printer information generates the print queue for the virtual printer and stores the print queue in the control apparatus 110. Then, in S817, the control apparatus 110 notifies the registration process result of the virtual printer to the user.

Next, in S818, the user executes the registration process of the printer 130 as the local printer on the control apparatus 110. Specifically, in S818, the control apparatus 110 receives the instruction of executing the addition process (installation process) of adding the printer 130 as the local printer. In the case where the registration process is started, in S819, the control apparatus 110 requests the printer information from the printer 130 and, in S820, the printer 130 sends the printer information as a response. The printer information obtained in S820 is the same as the example described in the first embodiment. In S821, the control apparatus 110 that has obtained the printer information generates the print queue for the local printer and stores the print queue in the control apparatus 110. Then, in S822, the control apparatus 110 notifies the registration process result of the printer 130 to the user.

The aforementioned process achieves a state where the print queue for the local printer and the print queue for the virtual printer are generated on the control apparatus 110.

<Printer Selection Process of Application>

Figure 9:
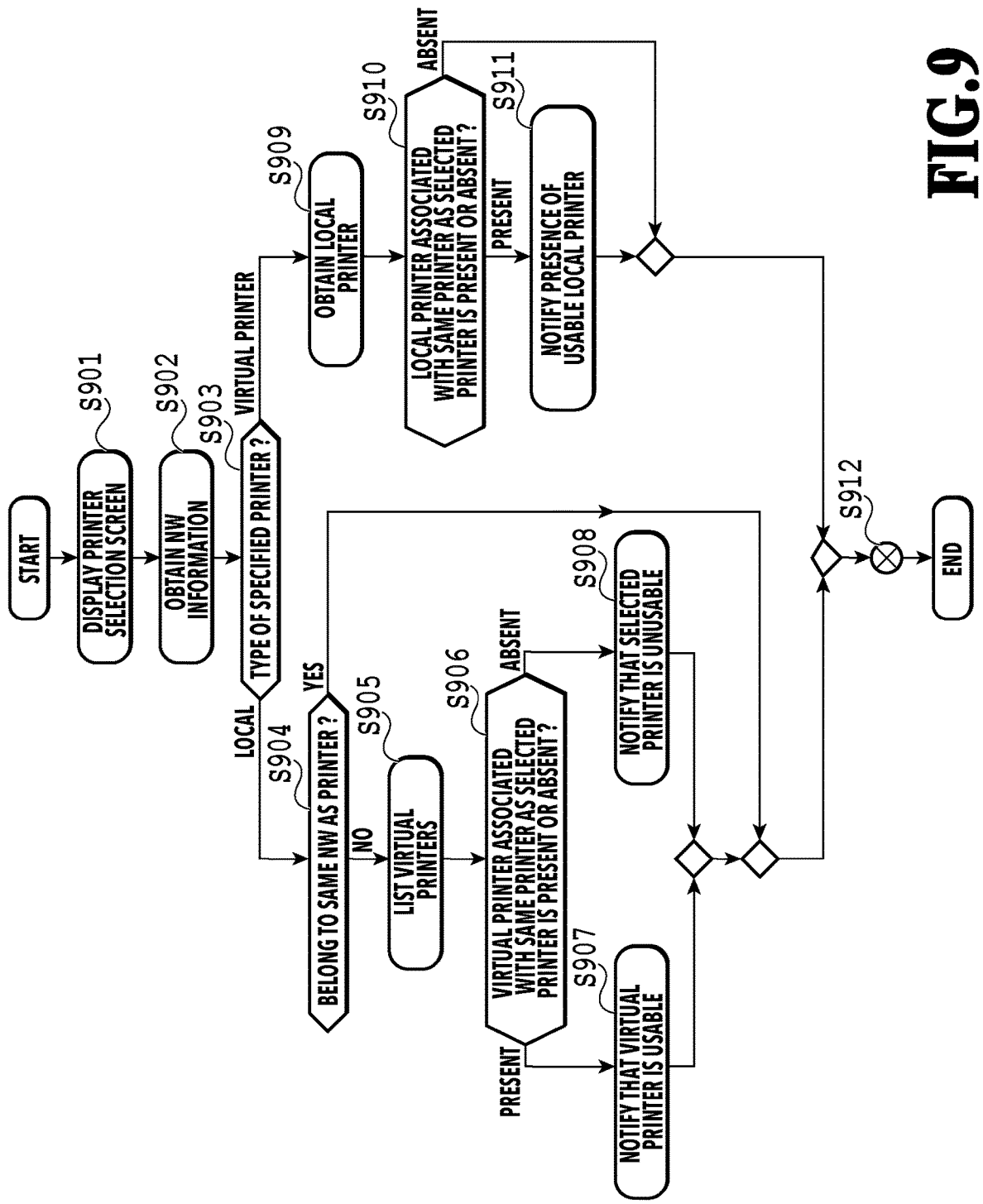
FIG. 9 is a flowchart illustrating an example of a printer selection process.

FIG. 9 is a flowchart illustrating an example of the printer selection process by the application 111 in the embodiment. In S901, the application 111 displays the printer selection screen for selecting a printer to be used for printing of desired data such as a picture, a document, or the like in response to an instruction from the user. Then, the application 111 receives selection of a printer (print queue) to execute the print process, from the user on the printer selection screen.

Next, in S902, the application 111 obtains information on the network environment in which the control apparatus 110 is currently participating. As described above, the information on the network environment includes information such as the IP address and the subnet mask of the control apparatus 110. In S903, the application 111 refers to information associated with the print queue selected by the user in the printer selection screen in S901 to determine the type of the selected printer. Specifically, in S903, the application 111 determines whether the selected printer is the local printer or the virtual printer. In the case where the information associated with the selected printer (print queue) includes information indicating that the printer is the virtual printer, the application 111 determines that the selected printer is the virtual printer. Meanwhile, in the case where the information associated with the selected printer (print queue) does not include the information indicating that the printer is the virtual printer, the application 111 determines that the selected printer is the local printer.

In the case where the printer selected by the user is the local printer, the process proceeds to S904. In S904, the application 111 determines whether the control apparatus 110 and the local printer selected by the user belong to the same network. As an example of the determination method, the application 111 obtains subnet information of the control apparatus 110 from the IP address and the subnet mask thereof. Moreover, the application 111 obtains subnet information of the transmission destination address of the local printer selected by the user. Then, the application 111 can compare the subnet information of the control apparatus 110 and the subnet information of the local printer and thereby determine whether the control apparatus 110 and the local printer selected by the user belong to the same network.

In the case where the application 111 determines that the control apparatus 110 and the local printer selected by the user belong to the same network in S904, the process proceeds to S912 and is terminated.

Meanwhile, in the case where the application 111 determines that the control apparatus 110 and the local printer selected by the user belong to different networks in S904, the process proceeds to S905. In S905, the application 111 obtains the print queues for the virtual printers already registered on the control apparatus 110. Then, in S906, the application 111 compares the printer information associated with each of the obtained print queues for the virtual printers and the information associated with the print queue selected by the user. The application 111 thereby checks presence or absence of the virtual printer representing the same printer as the printer selected by the user. Specifically, the application 111 compares the pieces of information that are included in the pieces of information associated with the respective print queues and that indicate uniqueness of the respective printers to determine presence or absence of the same printer.

In the case where the application 111 determines that the virtual printer representing the same printer as the printer selected by the user is present, in S907, the application 111 notifies the presence of the usable virtual printer to the user. Meanwhile, in the case where the virtual printer representing the same printer as the printer selected by the user is absent, in S908, the application 111 notifies that the printer selected by the user cannot be used, to the user. After the execution of the notification process in S907 or S908, the process proceeds to S912 and the application 111 terminates the process.

Figure 10A:
FIGS. 10A to 10C are views illustrating examples of a notification screen.
Figure 10B:
Figure 10C:

FIGS. 10A to 10C are views illustrating examples of a notification screen displayed on the display 214 by the application 111 in the embodiment. FIG. 10A is an example of the notification screen displayed by the application 111 in S907. The notification screen displays that the local printer selected by the user cannot be used and the virtual printer usable instead is present. The user can close this notification screen by pressing an OK button on the screen.

FIG. 10B is an example of the notification screen displayed by the application 111 in S908. The notification screen states that the local printer selected by the user cannot be used. The user can close this notification screen by pressing an OK button on the screen.

As described above, there is a situation where, in the case where the user selects the printer belonging to the network different from that of the control apparatus 110, the virtual printer generated for this printer is present on the control apparatus 110. In this case, the application 111 notifies the presence of the usable virtual printer to the user before the start of the print process by performing the processes described above. Specifically, in the case where the user selects the printer (print queue), the application 111 notifies the presence of the usable virtual printer to the user. This can avoid occurrence of a situation where appropriate printing cannot be performed due to selection of an unsuitable printer by the user.

Description continues by returning to FIG. 9. Next, description is given of a process in the case where the printer selected by the user in S903 is the virtual printer. In the case where the printer selected by the user in S903 is the virtual printer, the process proceeds to S909. In S909, the application 111 obtains the print queues for the local printers already registered on the control apparatus 110. In S910, the application 111 determines whether the same printer as the virtual printer selected by the user is registered as the local printer.

First, the application 111 compares the pieces of information that are included in the pieces of information associated with the respective print queues and that indicate uniqueness of the respective printers to determine presence or absence of the same printer. In the case where the print queue for the local printer that is the same printer as the virtual printer is included in the print queues obtained in S909, the application 111 performs further determination based on the information on the network environment obtained in S902. Specifically, the application 111 determines whether the print queue is a print queue for the local printer belonging to the same network as the control apparatus 110. As an example of the determination method, the application 111 obtains the subnet information of the control apparatus 110 from the IP address and the subnet mask thereof. Moreover, the application 111 can compare the subnet information of the control apparatus 110 and the subnet information of the transmission destination address of the local printer and thereby determine whether the control apparatus 110 and the local printer belong to the same network. Then, in the case where the print queue for the local printer that is the same printer as the virtual printer is the print queue for the local printer belonging to the same network as the control apparatus 110, the process proceeds to S911. In S911, the application 111 notifies the presence of the usable local printer to the user. Thereafter, the process proceeds to S912 and the application 111 terminates the process. The process proceeds to S912 and is terminated also in the case where the print queue for the local printer that is the same printer as the virtual printer is absent in S910 or in the case where the print queue for the local printer belonging to the same network is absent.

FIG. 10C is an example of the notification screen displayed in S911. The notification screen states that the virtual printer selected by the user is selected and the local printer that is the same printer as the virtual printer and that is usable instead is present. Moreover, the user can close this notification screen by pressing an OK button.

As described above, in the case where the user selects the virtual printer, the application 111 determines whether the print queue for the local printer that is the same printer as the selected virtual printer and that belongs to the same network as the control apparatus 110 is present. In the case where the print queue for the local printer that is the same printer as the virtual printer and that belongs to the same network as the control apparatus 110 is present, the application 111 notifies the presence of the usable local printer to the user before the start of the print process. The user can thereby detect selection of a printer that may cause unnecessary communication in the print process, before the start of the print process.

Third Embodiment

Also in the present embodiment, description is given of an example of the process in the case where the print queues for the same printer are created in the control apparatus 110 and the print server 120, respectively, and are registered in the control apparatus 110 as in the second embodiment. In the second embodiment, description is given of the example in which the notification of prompting the user to select a suitable printer is given in the process in the application 111. In the present embodiment, description is given of an example in which the user is prompted to select a suitable printer also in a process subsequent to the instruction of the start of the print process on the application 111 by the user. In the embodiment, description is given of an example in which the preliminary spool processing unit 112 performs the notification. Specifically, before the print data is transmitted from the preliminary spool processing unit 112 to the spooler 113 activated in the control apparatus 110, the preliminary spool processing unit 112 determines whether the printer (print queue) selected by the user is usable or not. Note that, in the embodiment, description is given assuming that the registration processes of the local printer and the virtual printer for the control apparatus 110 illustrated in FIG. 8 are completed.

<Print Process of Printer>

Figure 11:
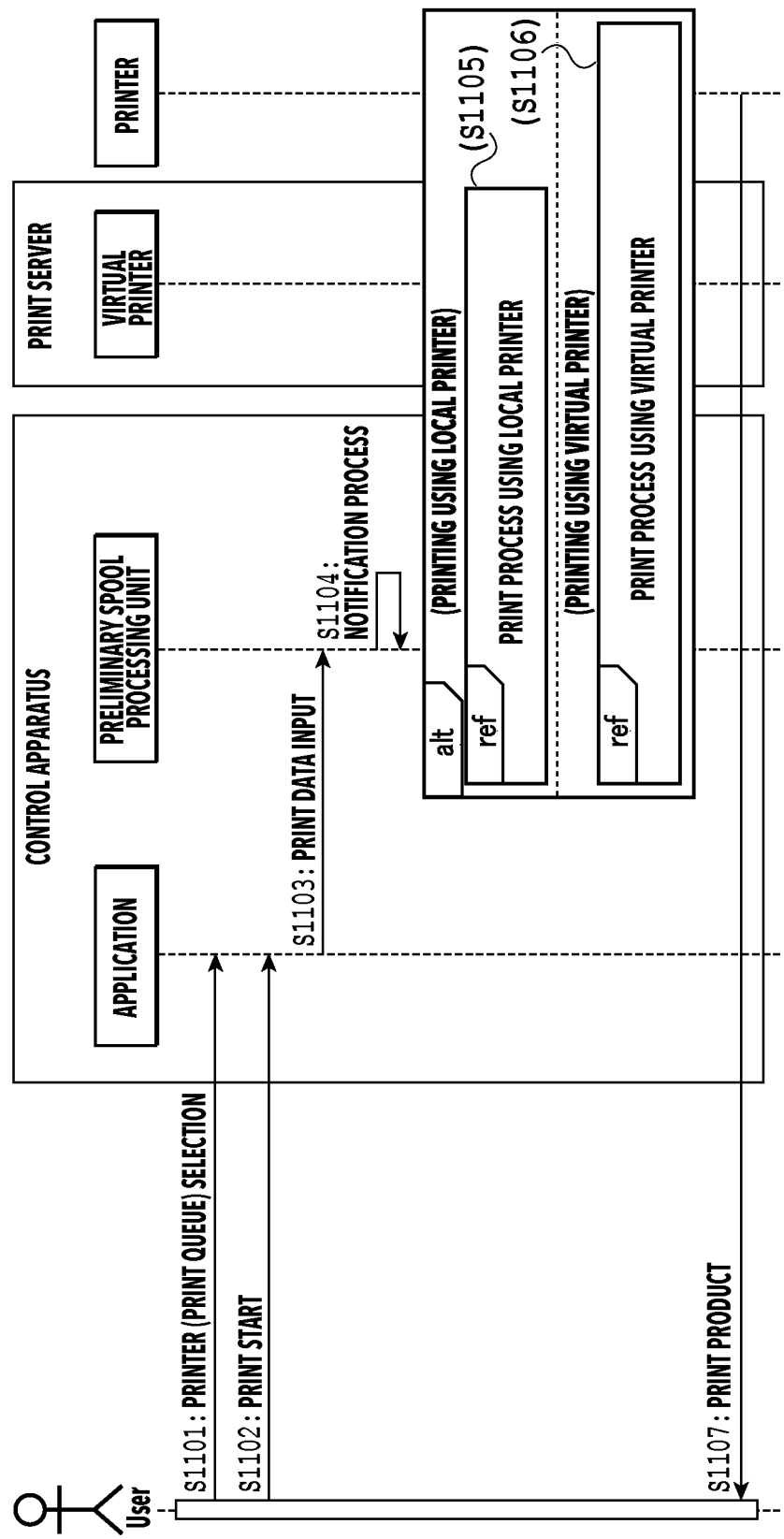
FIG. 11 is a sequence diagram illustrating an example of the print process.

FIG. 11 is a sequence diagram illustrating an example of the print process in the embodiment. Note that, in the description of the embodiment, description of the same processes as those in the first and second embodiments are omitted in some cases.

In S1101, the user causes the printer selection screen to be displayed on the application 111 and selects the printer (print queue) to execute the print process to print desired data such as a picture, a document, or the like by using the application 111. Specifically, the application 111 of the control apparatus 110 receives the display instruction of the printer selection screen from the user and displays the printer selection screen on the display 214 to receive selection of the printer.

In S1102, the user instructs the application 111 to start the print process for the selected printer. Specifically, in S1102, the application 111 receives the execution instruction of the print process. In S1103, the application 111 that has received the instruction of starting the print process inputs the print data into the preliminary spool processing unit 112. In S1104, the preliminary spool processing unit 112 that has received the print data performs the notification process depending on the printer selected by the user. Details of S1104 are described later in FIG. 12.

Thereafter, the preliminary spool processing unit 112 executes the print process for the printer determined after the notification process of S1104 (S1105, S1106). In this case, in the print process using the local printer in S1105, the same processes as S609 to S614 of FIG. 6B are performed. Meanwhile, in the print process using the virtual printer in S1106, the same processes as S615 to S621 of FIG. 6B are performed. Thereafter, in S1107, the printer 130 that has received the print command from the control apparatus 110 or the print server 120 performs the print process according to the print command and provides a print product to the user.

<Notification Process>

Figure 12:
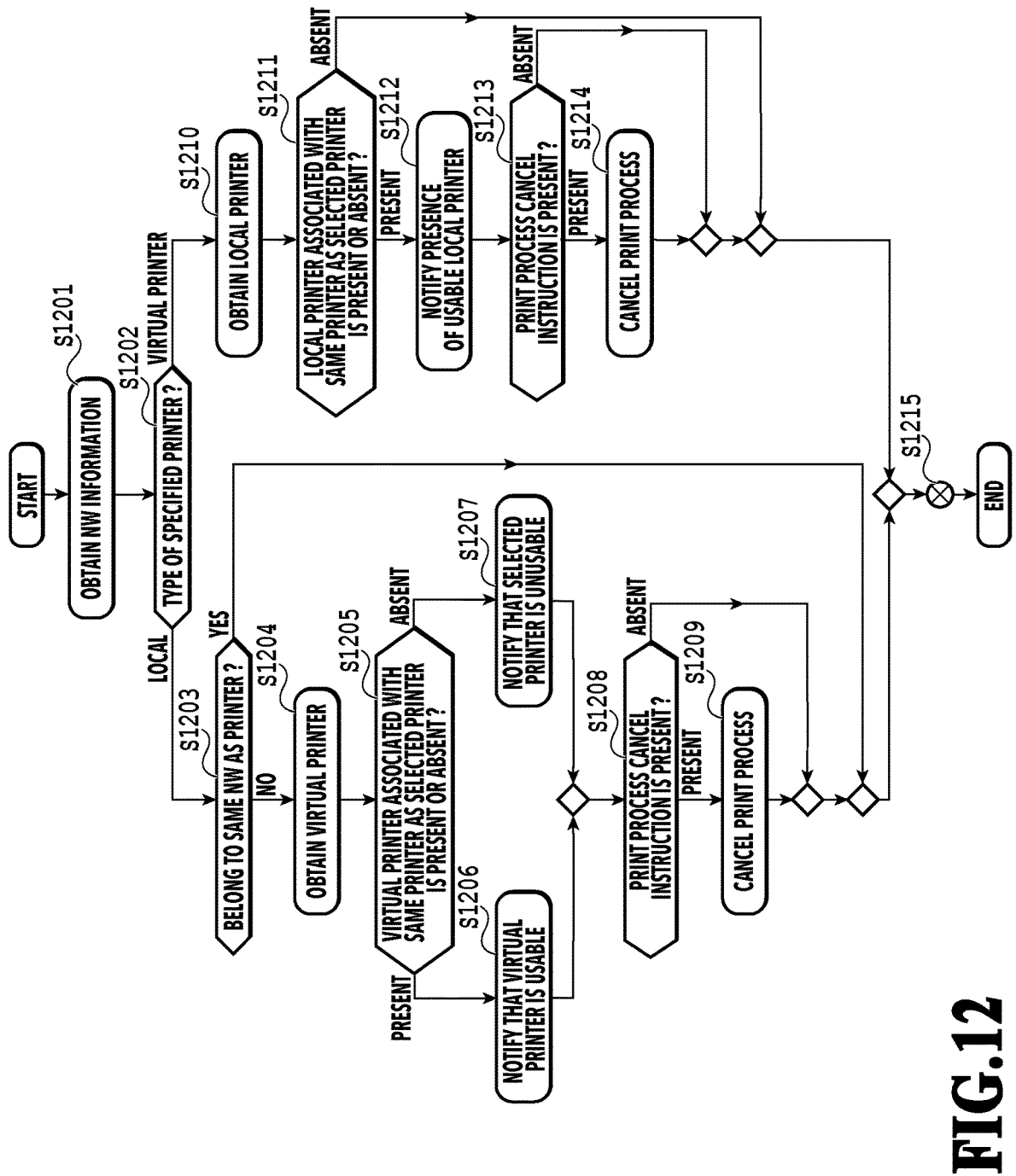
FIG. 12 is a diagram illustrating an example of a flowchart illustrating details of a notification process.

FIG. 12 is a diagram illustrating an example of a flowchart illustrating details of the notification process of S1104 by the preliminary spool processing unit 112. In S1201, the preliminary spool processing unit 112 that has received the print data from the application 111 obtains the information on the network environment in which the control apparatus 110 is currently participating. In this case, the information on the network environment includes information such as the IP address and the subnet mask of the control apparatus 110. Thereafter, in S1202, the preliminary spool processing unit 112 refers to the information associated with the print queue selected by the user to determine the type of the printer selected by the user. In the case where the information associated with the print queue includes information indicating that the printer is the virtual printer, the preliminary spool processing unit 112 determines that the printer is the virtual printer. In the case where the information associated with the print queue does not include the information indicating that the printer is the virtual printer, the preliminary spool processing unit 112 determines that the printer is the local printer.

In the case where the printer selected by the user is the local printer, the process proceeds to S1203. In S1203, the preliminary spool processing unit 112 determines whether the control apparatus 110 and the local printer selected by the user belong to the same network. Examples of the determination method include the same method as the example described in the second embodiment. In the case where the preliminary spool processing unit 112 determines that the control apparatus 110 and the local printer selected by the user belong to the same network, the process proceeds to S1215 and the notification process is terminated.

Meanwhile, in the case where the preliminary spool processing unit 112 determines that the control apparatus 110 and the local printer selected by the user belong to different networks in S1203, the process proceeds to S1204.

In S1204, the preliminary spool processing unit 112 obtains the print queues for the virtual printers already registered on the control apparatus 110. Then, in S1205, the preliminary spool processing unit 112 compares the printer information associated with each of the obtained print queues for the virtual printers and the information associated with the print queue selected by the user. The preliminary spool processing unit 112 thereby checks presence or absence of the virtual printer representing the same printer as the printer selected by the user. Specifically, the preliminary spool processing unit 112 compares the pieces of information that are included in the pieces of information associated with the respective print queues and that indicate uniqueness of the respective printers to determine presence or absence of the same printer. In the case where the preliminary spool processing unit 112 determines that the virtual printer representing the same printer as the printer selected by the user is present, the process proceeds to S1206 and the preliminary spool processing unit 112 notifies the presence of the usable virtual printer to the user. Meanwhile, in the case where the virtual printer representing the same printer as the printer selected by the user is absent, the process proceeds to S1207 and the preliminary spool processing unit 112 notifies that the printer selected by the user cannot be used, to the user. In the notification to the user in S1206 or S1207, a user interface part for canceling the print process in the local printer designated by the user is also presented.

Figure 13A:
FIGS. 13A to 13C are views illustrating examples of the notification screen.
Figure 13B:
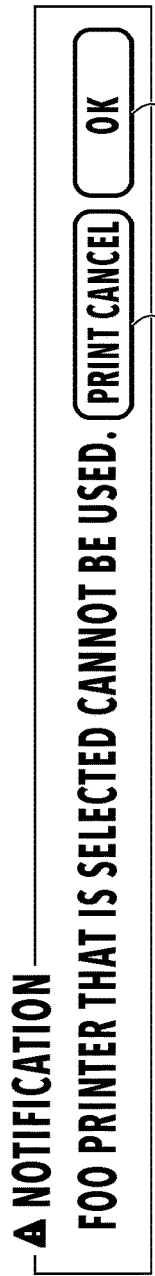
Figure 13C:
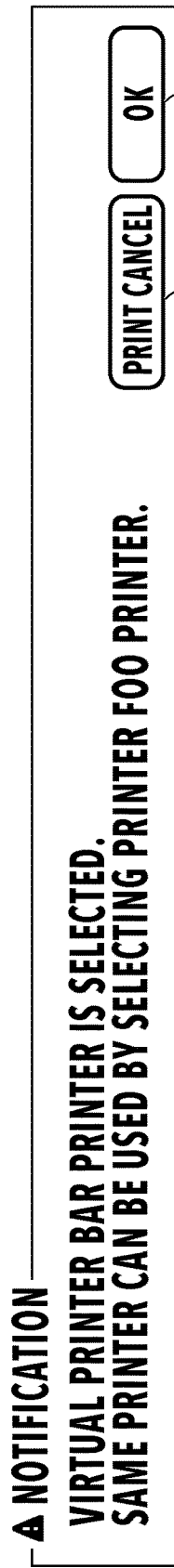

FIGS. 13A to 13C are views illustrating examples of the notification screen displayed on the display 214 by the preliminary spool processing unit 112 in the embodiment. FIG. 13A is an example of the notification screen displayed on the display 214 by the preliminary spool processing unit 112 in S1206. The notification screen states that the local printer selected by the user cannot be used and the virtual printer usable instead is present. The user can close this notification screen and cause the subsequent processes to go on by pressing an OK button 1301 on the screen. In the embodiment, the notification screen includes a print cancel button 1302. The user can cancel the print process and abort the subsequent processes by pressing the print cancel button 1302 on the notification screen. FIG. 13B is an example of the notification screen displayed on the display 214 by the preliminary spool processing unit 112 in S1207. The notification screen states that the local printer selected by the user cannot be used. The user can close this notification screen and cause the subsequent processes to go on by pressing the OK button 1301 on the screen. Moreover, the user can cancel the print process and abort the subsequent processes by pressing the print cancel button 1302 on the notification screen.

Returning to the description of FIG. 12, after the notification process in S1206 or S1207 is executed, in S1208, the preliminary spool processing unit 112 checks presence or absence of a cancel instruction of the print process from the user. In the case where the cancel instruction from the user is present, the process proceeds to S1209 and the preliminary spool processing unit 112 deletes the received print data. Then, the process proceeds to S1215 and the notification process is terminated. Meanwhile, in the case where the cancel instruction from the user is absent in S1208, the preliminary spool processing unit 112 causes the process to proceed to S1215 and terminates the notification process.

As described above, there is a situation where, in the case where the user selects the printer belonging to the network different from that of the control apparatus 110, the virtual printer generated for this printer is present on the control apparatus 110. In this case, the preliminary spool processing unit 112 can notify the presence of the usable virtual printer to the user and also cancel the print process at the instruction of the user by performing the processes described above. A failure in the print process due to unsuitable printer selection can be thereby suppressed even after the user instructs start of the print process on the application 111.

Next, description is given of a process in the case where the printer selected by the user in S1202 is the virtual printer. In the case where the printer selected by the user in S1202 is the virtual printer, the process proceeds to S1210. In S1210, the preliminary spool processing unit 112 obtains the print queues for the local printers already registered on the control apparatus 110. In S1211, the preliminary spool processing unit 112 determines whether the same printer as the virtual printer selected by the user is registered as the local printer.

First, the preliminary spool processing unit 112 compares the pieces of information that are included in the pieces of information associated with the respective print queues and that indicate uniqueness of the respective printers to determine presence or absence of the same printer. In the case where the print queue for the local printer that is the same printer as the virtual printer is included in the print queues obtained in S1210, the preliminary spool processing unit 112 performs further determination based on the information on the network environment obtained in S1201. Specifically, the preliminary spool processing unit 112 determines whether the print queue is the print queue for the local printer belonging to the same network as the control apparatus 110. As an example of the determination method, the preliminary spool processing unit 112 obtains the subnet information of the control apparatus 110 from the IP address and the subnet mask thereof. Moreover, the preliminary spool processing unit 112 can compare the subnet information of the control apparatus 110 and the subnet information of the transmission destination address of the local printer and thereby determine whether the control apparatus 110 and the local printer belong to the same network. Then, in the case where the print queue for the local printer that is the same printer as the virtual printer is not the print queue for the local printer belonging to the same network as the control apparatus 110, the preliminary spool processing unit 112 causes the process to proceed to S1215 and terminates the notification process.

Meanwhile, in the case where the print queue for the local printer that is the same printer as the virtual printer is the print queue for the local printer belonging to the same network as the control apparatus 110, the process proceeds to S1212. In S1212, the preliminary spool processing unit 112 notifies the presence of the usable local printer to the user. In the notification to the user in S1212, a user interface part for canceling the print process in the virtual printer designated by the user is also presented.

FIG. 13C is an example of the notification screen displayed on the display 214 by the preliminary spool processing unit 112 in S1212. The notification screen states that the virtual printer selected by the user is selected and the local printer that is the same printer as the virtual printer and that is usable instead is present. The user can close the notification screen and cause the subsequent processes to go on by pressing the OK button 1301 on the screen. Moreover, the user can cancel the print process and abort the subsequent processes by pressing the print cancel button 1302 on the notification screen.

Description continues by returning to FIG. 12. After the execution of the notification process in S1212, in S1213, the preliminary spool processing unit 112 checks presence or absence of the cancel instruction of the print process from the user. In the case where the cancel instruction from the user is present, the process proceeds to S1214 and the preliminary spool processing unit 112 deletes the received print data. Then, the process proceeds to S1215 and the notification process is terminated. Meanwhile, in the case where the cancel instruction from the user is absent in S1213, the process proceeds to S1215 and the preliminary spool processing unit 112 terminates the notification process.

As described above, in the case where the user selects the virtual printer, the preliminary spool processing unit 112 determines whether the print queue for the local printer that is the same printer as the virtual printer and that belongs to the same network as the control apparatus 110 is present. In the case where the print queue for the local printer that belongs to the same network as the control apparatus 110 is present, the preliminary spool processing unit 112 notifies the presence of the usable local printer to the user before the start of the print process. Moreover, the print process can be canceled at the instruction of the user. The user can thereby detect selection of a printer that may cause unnecessary communication in the print process and select a suitable printer, also after the instruction of the start of the print process on the application 111.

Fourth Embodiment

In the first to third embodiments, description is given of the example in which the printing is performed by transmitting the print data saved in the control apparatus 110 from the control apparatus 110 to the print server 120 or the printer 130.

In the present embodiment, description is given of an example in which the print data saved outside the control apparatus 110 is printed. For example, assume a case where the user instructs printing of the print data arranged on the print server 120 by using the application 111. In this case, the print data can be converted to the print command by the print command conversion unit 124 of the print server 120 and transmitted from the print server 120 to the printer 130 without passing the control apparatus 110.

Meanwhile, in the case where the print data is converted to the print command, the data amount of the print command may become larger than the data amount of the original print data. In this case, the data amount on the Internet increases. Accordingly, the print data is once transferred from the print server 120 to the control apparatus 110 and then converted to the print command on the control apparatus 110. Thereafter, the print command is transferred from the control apparatus 110 to the printer 130 that is the local printer. Performing printing in the local printer via the control apparatus 110 as described above can reduce the data volume size transmitted and received on the Internet from that in the case where the print command is transmitted from the print server 120 to the printer 130.

In the embodiment, for example, in the case where the user selects printing of the print data arranged on the print server 120 by using the application 111, the print server 120 converts the print data to the print command. Then, in the case where the data size of the converted print command is larger than a predetermined data size, the print server 120 transmits the print data before the conversion to the control apparatus 110. The control apparatus 110 that has received the print data performs the process from S609 to S614 and then transmits the print command to the printer 130 via the local network.

In the case where the print server 120 is connected to the control apparatus 110 and the printer 130 via a pay-per-use Internet line, it is preferable that the data size transmitted and received on the Internet line is small from the viewpoint of communication cost. Performing the process of the embodiment enables automatic selection of a path preferable from the viewpoint of the transmitted and received data size.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-048836, filed Mar. 23, 2021, which is hereby incorporated by reference herein in its entirety.

What is claimed is:

1. A method of controlling an information processing apparatus, the method comprising:
registering a printer in the information processing apparatus;
generating a print queue for the printer in a case where the printer is registered;
managing a plurality of addresses that are transmission destinations of print data in association with the generated print queue;
in a case where the plurality of addresses are associated with a print queue corresponding to an option selected by a user in a screen for selecting a printer to be caused to perform printing based on print data, determining any address of the plurality of addresses as a transmission destination address based on a predetermined condition; and
performing control to transmit the print data to the determined transmission destination address.

2. The method according to claim 1, wherein,
in the case where a second printer that is the same printer as a first printer already registered and that is used in a print path different from a print path of the first printer is registered, a print queue for the second printer is not generated, and
an address of the second printer is associated with a print queue of the first printer together with an address of the first printer.

3. The method according to claim 2, wherein the print paths include a print path of local print and a print path using a print server.

4. The method according to claim 1, wherein
the predetermined condition includes a condition based on information on a connection mode between the computer and another device.

5. The method according to claim 4, wherein, in the case where the connection mode is a connection mode of a local network, an address of local print among the managed addresses is determined as the transmission destination address.

6. The method according to claim 4, wherein, in the case where the connection mode is not a connection mode of a local network, an address of a virtual printer in a print server among the managed address is determined as the transmission destination address.

7. The method according to claim 4, wherein
preferential information indicating an address that is preferentially used among the plurality of addresses is additionally associated, and
in the case where the designated print queue is the print queue associated with the preferential information, the transmission destination address is determined according to the preferential information irrespective of the connection mode.

8. The method according to claim 4, wherein the determination is performed before the inputted print data is inputted into a spooler activated in the computer.

9. An information processing apparatus comprising:
a memory containing instructions, and
a processor executing the instructions to
register a printer in the information processing apparatus;
generate a print queue for the printer in a case where the printer is registered;
manage a plurality of addresses that are transmission destinations of print data in association with the generated print queue;
in a case where the plurality of addresses are associated with a print queue corresponding to an option selected by a user in a screen for selecting a printer to be caused to perform printing based on print data, determine any address of the plurality of addresses as a transmission destination address based on a predetermined condition; and
perform control to transmit the print data to the determined transmission destination address.

10. The information processing apparatus according to claim 9, wherein,
in the case where a second printer that is the same printer as a first printer already registered and that is used in a print path different from a print path of the first printer is registered, a print queue for the second printer is not generated, and
an address of the second printer is associated with a print queue of the first printer together with an address of the first printer.

11. The information processing apparatus according to claim 10, wherein the print paths include a print path of local print and a print path using a print server.

12. The information processing apparatus according to claim 9, wherein
the predetermined condition includes a condition based on information on a connection mode between the computer and another device.

13. The information processing apparatus according to claim 12, wherein, in the case where the connection mode is a connection mode of a local network, an address of local print among the managed addresses is determined as the transmission destination address.

14. The information processing apparatus according to claim 12, wherein, in the case where the connection mode is not a connection mode of a local network, an address of a virtual printer in a print server among the managed addresses is determined as the transmission destination address.

15. The information processing apparatus according to claim 12, wherein
preferential information indicating an address that is preferentially used among the plurality of addresses is additionally associated, and
in the case where the designated print queue is the print queue associated with the preferential information, the transmission destination address is determined according to the preferential information irrespective of the connection mode.

16. The information processing apparatus according to claim 12, wherein the transmission destination address is determined before the inputted print data is inputted into a spooler activated in the computer.

17. A non-transitory computer readable storage medium storing a program which causes a computer to execute a method of controlling an information processing apparatus, the method comprising:
registering a printer in the information processing apparatus;
generating a print queue for the printer in a case where the printer is registered; and
managing a plurality of addresses that are transmission destinations of print data in association with the generated print queue;
in a case where the plurality of addresses are associated with a print queue corresponding to an option selected by a user in a screen for selecting a printer to be caused to perform printing based on print data, determining any address of the plurality of addresses as a transmission destination address based on a predetermined condition; and
performing control to transmit the print data to the determined transmission destination address.

18. The non-transitory computer readable storage medium according to claim 17, wherein,
in the case where a second printer that is the same printer as a first printer already registered and that is used in a print path different from a print path of the first printer is registered, a print queue for the second printer is not generated, and
an address of the second printer is associated with a print queue of the first printer together with an address of the first printer.

19. The non-transitory computer readable storage medium according to claim 18, wherein the print paths include a print path of local print and a print path using a print server.

20. The non-transitory computer readable storage medium according to claim 17, wherein the predetermined condition includes a condition based on information on a connection mode between the computer and another device.

21. The non-transitory computer readable storage medium according to claim 20, wherein, in the case where the connection mode is a connection mode of a local network, an address of local print among the managed addresses is determined as the transmission destination address.

22. The non-transitory computer readable storage medium according to claim 20, wherein, in the case where the connection mode is not a connection mode of a local network, an address of a virtual printer in a print server among the managed address is determined as the transmission destination address.

23. The non-transitory computer readable storage medium according to claim 20, wherein preferential information indicating an address that is preferentially used among the plurality of addresses is additionally associated, and in the case where the designated print queue is the print queue associated with the preferential information, the transmission destination address is determined according to the preferential information irrespective of the connection mode.

24. The non-transitory computer readable storage medium according to claim 20, wherein the determination is performed before the inputted print data is inputted into a spooler activated in the computer.

\* \* \* \* \*